United States Patent
Chen et al.

(10) Patent No.: US 12,226,823 B2
(45) Date of Patent: Feb. 18, 2025

(54) ALLOY COMPOSITION, METHOD AND APPARATUS THEREFOR

(71) Applicant: Wisconsin Alumni Research Foundation, Madison, WI (US)

(72) Inventors: Lianyi Chen, Rolla, MO (US); Qilin Guo, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 213 days.

(21) Appl. No.: 17/130,656

(22) Filed: Dec. 22, 2020

(65) Prior Publication Data

US 2022/0193775 A1 Jun. 23, 2022

(51) Int. Cl.
*B22F 10/50* (2021.01)
*B22F 10/28* (2021.01)
(Continued)

(52) U.S. Cl.
CPC .............. *B22F 10/50* (2021.01); *B22F 10/28* (2021.01); *B23K 26/342* (2015.10); *B33Y 10/00* (2014.12); *C22C 38/002* (2013.01); *C22C 38/02* (2013.01); *C22C 38/04* (2013.01); *C22C 38/42* (2013.01); *C22C 38/48* (2013.01);
(Continued)

(58) Field of Classification Search
CPC ............ B23K 2103/05; B23K 26/0006; B23K 26/342; B22F 10/28; B22F 10/36; B22F 10/366; B22F 10/38; B22F 10/50; B22F 2301/35; B22F 2999/00; B22F 3/1028; B33Y 10/00; B33Y 40/00; B33Y 50/02; B33Y 70/00; C22C 33/0285; C22C 38/002; C22C 38/02; C22C 38/04; C22C 38/42; C22C 38/48; C22C 38/00; C21D 1/74; C21D 2211/008; Y02P 10/25

See application file for complete search history.

(56) References Cited

U.S. PATENT DOCUMENTS 11,059,102 B2 * 7/2021 Boehm ................. B22F 10/366
11,331,850 B2 * 5/2022 Motoyama ................ B22F 7/08
(Continued)

FOREIGN PATENT DOCUMENTS

CN 105586477 A * 5/2016
CN 108213412 A * 6/2018
(Continued)

OTHER PUBLICATIONS

Rachel A. Abrahams, The Development of High Strength Corrosion Resistant Precipitation Hardening Cast Steels, A dissertation in Industrial Engineering, The Pennsylvania State University, The Graduate School, College of Engineering, Dec. 2010, copywrite 2010.
(Continued)

*Primary Examiner* — Dana Ross
*Assistant Examiner* — Adam M Eckardt
(74) *Attorney, Agent, or Firm* — Crawford Maunu PLLC

(57) ABSTRACT

Aspects of the disclosure are directed to forming a three-dimensional (3D) structure by depositing an alloy composition on a target, and solidifying portions of the alloy composition to form the 3D structure. The solidifying includes producing a martensitic structure by destabilizing a ferrite phase of the alloy composition while solidifying the alloy composition.

21 Claims, 8 Drawing Sheets

(51) Int. Cl.

| | |
|---|---|
| *B23K 26/342* | (2014.01) |
| *B33Y 10/00* | (2015.01) |
| *C21D 1/74* | (2006.01) |
| *C22C 38/00* | (2006.01) |
| *C22C 38/02* | (2006.01) |
| *C22C 38/04* | (2006.01) |
| *C22C 38/42* | (2006.01) |
| *C22C 38/48* | (2006.01) |

(52) U.S. Cl.
CPC ............ *B22F 2301/35* (2013.01); *C21D 1/74* (2013.01); *C21D 2211/008* (2013.01)

(56) References Cited

U.S. PATENT DOCUMENTS

| | | | | |
|---|---|---|---|---|
| 2009/0229417 | A1* | 9/2009 | Shepard | B32B 15/011 148/648 |
| 2015/0328680 | A1* | 11/2015 | Tuffile | C22C 1/02 164/131 |
| 2016/0333450 | A1* | 11/2016 | Ikeda | B29C 67/00 |
| 2017/0080497 | A1* | 3/2017 | Tuffile | B22F 3/26 |
| 2021/0332465 | A1* | 10/2021 | Behera | C22C 38/40 |
| 2021/0387260 | A1* | 12/2021 | Bockler et al. | C21D 6/04 |
| 2022/0081745 | A1* | 3/2022 | Komai | B22F 10/64 |
| 2022/0193775 | A1* | 6/2022 | Chen | C22C 38/48 |
| 2022/0220583 | A1* | 7/2022 | Ota | B22F 10/28 |

FOREIGN PATENT DOCUMENTS

| | | | | |
|---|---|---|---|---|
| CN | 111054924 A | * | 4/2020 | |
| CN | 112496592 A | * | 3/2021 | B23K 35/3086 |
| DE | 102019206674 A | * | 11/2020 | |
| EP | 3533539 A1 | * | 9/2019 | B22F 3/1055 |
| JP | 2015507077 A | * | 3/2015 | |
| WO | WO-2019121879 A1 | * | 6/2019 | B22F 10/10 |
| WO | WO-2021185767 A1 | * | 9/2021 | B22F 1/00 |

OTHER PUBLICATIONS

Frazier, W. E., Metal Additive Manufacturing: A Review. J. Mater. Eng. Perform. 23, 1917-1928 (2014).

Colaco, R. & Vilar, R., Effect of the processing parameters on the proportion of retained austenite in laser surface melted tool steels. J. Mater. Sci. Lett. 17, 563-567 (1998).

Hengsbach, F. et al. Duplex stainless steel fabricated by selective laser melting—Microstructural and mechanical properties. Mater. Des. 133, 136-142 (2017).

Rodgers, T. M., Madison, J. D. & Tikare, V., Simulation of metal additive manufacturing microstructures using kinetic Monte Carlo. Comput. Mater. Sci. 135, 78-89 (2017).

Gu, D. D., Meiners, W., Wissenbach, K. & Poprawe, R., Laser additive manufacturing of metallic components: materials, processes and mechanisms. Int. Mater. Rev. 57, 133-164 (2012).

Yusuf, S. M. & Gao, N., Influence of energy density on metallurgy and properties in metal additive manufacturing. Mater. Sci. Technol. 33, 1269-1289 (2017).

Farshidianfar, M. H., Khajepour, A. & Gerlich, A. P., Effect of real-time cooling rate on microstructure in Laser Additive Manufacturing. J. Mater. Process. Technol. 231, 468-478 (2016).

Sames, W. J., List, F. A., Pannala, S., Dehoff, R. R. & Babu, S. S., The metallurgy and processing science of metal additive manufacturing. Int. Mater. Rev. 61, 315-360 (2016).

Herzog, D., Seyda, V., Wycisk, E. & Emmelmann, C., Additive manufacturing of metals. Acta Mater. 117, 371-392 (2016).

Debroy, T. et al., Additive manufacturing of metallic components—Process, structure and properties. Prog. Mater. Sci. 92, 112-224 (2018).

Zai, L. et al., Laser Powder Bed Fusion of Precipitation-Hardened Martensitic Stainless Steels: A Review. Metals (Basel). 10, 255 (2020).

Alnajjar, M., Christien, F., Wolski, K. & Bosch, C., Evidence of austenite by-passing in a stainless steel obtained from laser melting additive manufacturing. Addit. Manuf. 25, 187-195 (2019).

Alnajjar, M., Christien, F., Bosch, C. & Wolski, K, A comparative study of microstructure and hydrogen embrittlement of selective laser melted and wrought 17-4 PH stainless steel. Mater. Sci. Eng. A 785, 139363 (2020).

Adeyemi, A. A. et al., Influence of laser power on microstructure of laser metal deposited 17-4 ph stainless steel. IOP Conf. Ser. Mater. Sci. Eng. 225, 12028 (2017).

Facchini, L. et al., Metastable Austenite in 17-4 Precipitation-Hardening Stainless Steel Produced by Selective Laser Melting. Adv. Eng. Mater. 12, 184-188 (2010).

Murr, L. E. et al. Microstructures and Properties of 17-4 PH Stainless Steel Fabricated by Selective Laser Melting. J. Mater. Res. Technol. 1, 167-177 (2012).

Cheruvathur, S., Lass, E. A. & Campbell, C. E. Additive Manufacturing of 17-4 PH Stainless Steel: Post-processing Heat Treatment to Achieve Uniform Reproducible Microstructure. Jom 68, 930-942 (2016).

Rafi, H. K., Pal, D., Patil, N., Starr, T. L. & Stucker, B. E. Microstructure and Mechanical Behavior of 17-4 Precipitation Hardenable Steel Processed by Selective Laser Melting. J. Mater. Eng. Perform. 23, 4421-4428 (2014).

Vunnam, S., Saboo, A., Sudbrack, C. & Starr, T. L. Effect of powder chemical composition on the as-built microstructure of 17-4 PH stainless steel processed by selective laser melting. Addit. Manuf. 30, 100876 (2019).

Sun, Y., Hebert, R. J. & Aindow, M. Effect of heat treatments on microstructural evolution of additively manufactured and wrought 17-4PH stainless steel. Mater. Des. 156, 429-440 (2018).

Xiao, L. et al. Lattice-parameter variation with carbon content of martensite. I. X-ray-diffraction experimental study. Phys. Rev. B 52, 9970-9978 (1995).

Lass, E. A., Zhang, F. & Campbell, C. E. Nitrogen Effects in Additively Manufactured Martensitic Stainless Steels: Conventional Thermal Processing and Comparison with Wrought. Metall. Mater. Trans. A 51, 2318-2332 (2020).

Alnajjar, M. et al. Influence of microstructure and manganese sulfides on corrosion resistance of selective laser melted 17-4 PH stainless steel in acidic chloride medium. Corros. Sci. 168, 108585 (2020).

Guo, Q. et al. In-situ characterization and quantification of melt pool variation under constant input energy density in laser powder bed fusion additive manufacturing process. Addit. Manuf. 28, 600-609 (2019).

Jia, Q. & Gu, D. Selective laser melting additive manufacturing of Inconel 718 superalloy parts: Densification, microstructure and properties. J. Alloys Compd. 585, 713-721 (2014).

Kenel, C. et al. In situ investigation of phase transformations in Ti—6Al—4V under additive manufacturing conditions combining laser melting and high-speed micro-X-ray diffraction. Sci. Rep. 7, 16358 (2017).

Zhao, C. et al. Real-time monitoring of laser powder bed fusion process using high-speed X-ray imaging and diffraction. Sci. Rep. 7, 3602 (2017).

Guo, Q. et al. Transient dynamics of powder spattering in laser powder bed fusion additive manufacturing process revealed by in-situ high-speed high-energy x-ray imaging. Acta Mater. 151, 169-180 (2018).

* cited by examiner

| | Cr | Ni | Cu | Nb+Ta | Mn | C | P | S | Si | Fe |
|---|---|---|---|---|---|---|---|---|---|---|
| Spec | 15-17.5 | 3-5 | 3-5 | 0.15-0.45 | 0-1 | 0-0.07 | 0-0.04 | 0-0.03 | 0-1 | Bal |
| 3D-printed | 16.7 | 4.3 | 4 | 0.3 | 0.22 | 0.02 | 0.011 | 0.003 | 0.34 | Bal |
| Invention | 14.5-16 | 4-5.5 | 3-5.5 | 0.15-0.45 | 0 | 0 | 0 | 0 | 0 | Bal |

FIG. 2

ALLOY COMPOSITION, METHOD AND APPARATUS THEREFOR

This invention was made with government support under 2011354 awarded by the National Science Foundation. The government has certain rights in the invention.

BACKGROUND

Alloys are used for a multitude of structures, and may be formed in a variety of manners such as by casting, three-dimensional (3D) printing, and other approaches. However, for some applications it can be challenging to produce a product having a desirable structure. For instance, when cooling metal alloys, various phases of material and corresponding crystalline structures may form based on a variety of factors.

Stainless steel is an alloy used in a variety of applications. For instance, precipitation-hardened (PH) stainless steel known as 17-4 PH (otherwise known as AISI 630 or SAE Type 630) has a chemical makeup of approximately 15-17.5% chromium and 3-5% nickel, as well as 3-5% copper. 17-4 PH stainless steel may be manufactured as a fully martensitic stainless steel via methods such as forging, casting or welding. However, additively manufactured 17-4 PH has a strong tendency of reserving residual ferrite and austenite phases at room temperature upon solidification, which may provide undesirable mechanical and corrosion performance. For instance, in manufacturing with low cooling rates, 17-4 PH undergoes phase transformations as: liquid (L)—δ-ferrite (δ)—austenite (γ)—martensite (α'). However, with additive manufacturing, transformation to fully martensite (e.g., at least 90% or at least 95% martensite) can be challenging. As such, it can be challenging to obtain desired phases in materials built using additive manufacturing (AM) with multi-stage phase transformations, because such materials may be sensitive to complex AM processing conditions, such as rapid heating/cooling and chemical variation. For instance, 17-4 PH may undergo different solidification paths during solidification in AM processes, which leads to the formation of different unwanted phases in the printed parts.

It may also be challenging to obtain equiaxed grains in additive manufacturing, especially in powder bed fusion. Due to the high temperature gradient, columnar grains epitaxially grow from a previously deposited layer, along the build direction, and may be observed in additive manufactured parts. The columnar grains are generally coarse and characterized by anisotropic mechanical properties, which may be detrimental for applications involving multi-directional stresses.

These and other matters have presented challenges to the selection of materials and formation of structures, for a variety of applications.

SUMMARY

Various example embodiments are directed to a composition of matter, its implementation and resulting apparatuses thereof. Such embodiments may be useful for forming 3D structures, in a manner that addresses challenges including those noted above.

As may be implemented in accordance with one or more embodiments, a three-dimensional (3D) structure is formed by depositing an alloy composition on a target, and solidifying portions of the alloy composition to form the 3D structure. The solidification includes producing a martensitic structure by destabilizing a ferrite phase of the alloy composition while solidifying the alloy composition.

Another embodiment is directed to a method for additively manufacturing a three-dimensional (3D) structure. A first layer of the 3D structure is formed by depositing alloy powder on a target, liquefying the alloy powder via application of laser energy, and solidifying the liquefied alloy powder to produce a martensitic structure by destabilizing a ferrite phase of the alloy powder. Subsequent layers of the 3D structure are formed over the first layer by, for each subsequent layer, depositing additional alloy powder of the same composition of the alloy powder used in forming the first layer, liquefying the additional alloy powder via application of laser energy, and also solidifying the liquefied additional alloy powder to produce a martensitic structure by destabilizing a ferrite phase of the additional alloy powder.

Another embodiment is directed to an alloy powder composition of matter for forming martensitic 17-4 stainless steel via laser powder bed fusion additive manufacturing. The alloy powder comprises iron, chromium, nickel, copper, niobium, and tantalum.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIG. 2 shows components of an alloy composition, in accordance with various embodiments, and with reference to 17-4 specification values as well as 3D-printed values;

FIGS. 3A, 3B, 3C and 3D show phase transformation behavior of an alloy as may be implemented in accordance with one or more embodiments, in which:

FIG. 3A shows a phase constitution after cooling to room temperature,

FIGS. 3B and 3C show X-ray diffraction results showing the phase transformation behavior, and FIG. 3D shows an enhanced view of a portion of FIG. 3C; and FIGS. 4A-4B show a scan approach as may be implemented to achieve as built equiaxed fine grains utilizing an alloy composition as characterized herein, as may be implemented in accordance with one or more embodiments, in which:

FIG. 4A depicts scan patterns for four stacked layers, and

FIG. 4B depicts an example scan pattern for one of the layers shown in FIG. 4A, with hatch spacing.

Figure 1:
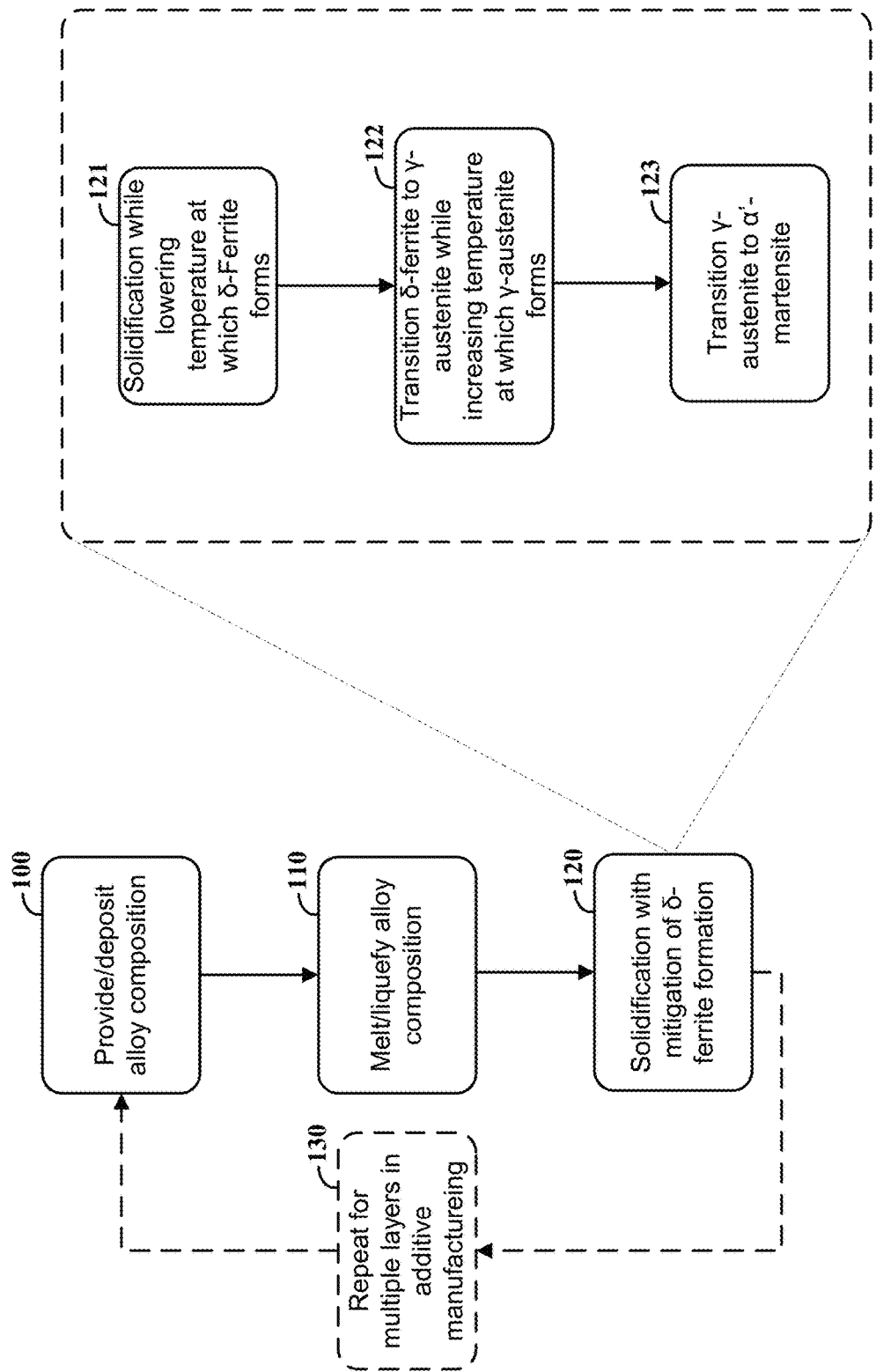
FIG. 1 shows a method for forming a structure, as may be implemented in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving the formation of 3D structures, as may include additive manufacturing, and which may involve what is often referred to as 3D printing and/or casting. In certain implementations, aspects of the present disclosure have been shown to be beneficial when used in the context of forming 3D metal structures using a composition of materials that facilitate a near fully or fully martensitic structure. While not necessarily so limited, various aspects may be appreciated through a discussion of examples using such exemplary contexts.

According to various example embodiments, a liquid alloy includes a composition of matter that operates to destabilize a ferrite phase of the alloy composition while it is solidified. This may involve, for instance, transforming δ-ferrite to austenite and otherwise mitigating the formation of δ-ferrite phase material in a solidified form of the alloy. Substantially all of the austenite may further be transformed to martensite, for instance such that the volume of the final structure is 90-100% martensite.

The liquid alloy may be provided, for example, as part of a casting or 3D printing operation, and may be formed by liquefying a powder alloy composition. In this context, an alloy composition may be deposited/provided on a target, and portions of the alloy composition may be solidified to form a 3D structure while destabilizing the ferrite phase to product a martensitic structure. In some instances, laser powder-bed fusion is utilized to effect laser melting successive layers of the alloy composition in powder form based on a 3D computer aided design (CAD) model.

Destabilizing the ferrite phase as characterized herein may be carried out in a variety of manners. In some embodiments, the alloy includes a composition of materials that reduces a temperature at which δ-ferrite phase material forms during cooling of the alloy, relative to a temperature at which δ-ferrite phase material forms during cooling of a 17-4 PH alloy composition. In other embodiments, the alloy includes a composition of materials that increases a temperature at which δ-ferrite phase material, which is formed from the alloy, transitions to γ-austenite phase material during cooling of the alloy, relative to a temperature at which δ-ferrite phase material transitions to γ-austenite during cooling of a 17-4 PH alloy composition. In certain embodiments, the composition of materials in the alloy are selected to effect both of the aforementioned aspects relating to reducing the temperature at which δ-ferrite phase material forms and to increases the temperature at which the δ-ferrite material transitions to γ-austenite. For each of these embodiments, the reference 17-4 PH alloy referred to as being relative to the δ-ferrite transitions may refer to that formed from an Argon-atomized powder 17-4 PH composition, which is liquefied as it is deposited in an additive manufacturing procedure.

In connection with particular embodiments, it has been recognized/discovered that an increase of Ni and Cu in a 17-4 PH composition can shorten the lifetime of δ-ferrite, promote the earlier formation of austenite, and reduce the δ-ferrite fraction during solidification. It has been further recognized that, compared with increasing Ni and Cu, increasing Cr exhibits the opposite trend. Mn may be excluded from the composition to mitigate high temperature volatility, and C and Si may be excluded from the composition to mitigate a drop of Ms temperature (the temperature at which martensite begins to form). The presence of impurity type elements such as O, N, P, S may be maintained as low as possible.

In certain embodiments, an alloy composition having materials consisting of iron, chromium, nickel, copper, niobium and tantalum is provided (e.g., deposited), and the composition of the respective materials is used to destabilize the ferrite phase of the alloy composition as it is solidified. For instance, a powder form of the alloy composition may be deposited, liquefied with a laser, and solidified to form a 3D martensitic structure as characterized herein.

In some implementations, the alloy composition is as follows: Fe: 74.7%, Cr: 15.2%, Ni: 4.8%, Cu: 5.0% and Nb: 0.3%. This composition is utilized to achieve the δ-ferrite phase transition temperatures as noted above with an additive manufacturing process, with a lattice parameter of the δ phase being 0.29403 nm upon initial solidification, relative to a lattice parameter of 0.29437 nm 17-4 PH, using an atomized Argon powder deposition with laser heating. Accordingly, the δ phase forms at a lower temperature such that its formation is delayed via the alloy composition, relative to δ phase formation in the 17-4 PH composition. The γ phase lattice parameter in the alloy composition is 0.36873 nm, whereas the Argon-atomized 17-4 PH lattice parameter is 0.36748 nm. Accordingly, the δ-γ transfer temperature in the alloy composition is higher than that of the 17-4 PH composition, which permits more time for the δ-γ transformation process to complete.

Turning now to the figures, FIG. 1 shows a flow diagram, as may be implemented in accordance with one or more embodiments. At block 100, an alloy composition is provided, such as by depositing and melting an alloy composition powder. At block 110, the alloy composition is melted or otherwise liquefied, such as by applying a laser to deposited powder as noted above. Certain approaches involve casting the alloy, in which blocks 100 and 110 are utilized to provide a melted alloy into a cast. At block 120, the alloy composition melt is solidified while mitigating the formation of δ-ferrite as characterized herein. When utilized in an additive manufacturing procedure, operations at blocks 100, 110 and 120 are repeated, as represented at 130.

Block 120 may further include facilitating transformation of a liquid phase provided at block 110 to δ-ferrite, transformation of the δ-ferrite to γ-austenite, and transformation of the γ-austenite to α' martensite, utilizing the composition provided at block 100 to lower a temperature at which δ-ferrite forms, to increase a temperature at which δ-ferrite transitions to γ-austenite, and to increase a temperature at which γ-austenite transforms to a' martensite. This is depicted at blocks 121, 122 and 123.

Various approaches may be implemented in connection with the method depicted in FIG. 1. In connection with a particular embodiment, in-situ laser-melting is performed with a composition of material of: Fe (74.7%), Cr (15.2%), Ni (4.8%), Cu (5.0%), and Nb (0.3%). Destabilization of δ-ferrite is achieved, as indicated by a short-lived δ-ferrite peak as well as complete δ (110)-γ (111) transformation. On the other hand, the γ-α' (austenite-martensite) transformation is also completed, with a high Ms temperature of ~170° C. (characterized by a lattice parameter of 0.28800 nm), which may be achieved via the exclusion of certain minor elements sometimes included in 17-4 PH. In this manner, fully martensite may be achieved at room temperature. The cooling rate in the sample may be increased from $1.88 \times 10^{4\circ}$ C./s to $8.66 \times 10^{4\circ}$ C./s and achieve fully martensite, with nearly identical solidification behavior in which a primary-solidified short-lived δ-ferrite transforming completely into austenite, and ending with a complete γ-α' transformation with a high Ms temperature in the range of 150° C.-190° C. Such a complete γ-α' transformation may also be achieved when impurities are introduced (e.g., during a manufacturing process), such as may result in increased O and N concentration.

In accordance with a particular embodiment, it has been recognized/discovered that a composition of matter having parameters in the ranges noted for the Alloy depicted in FIG. 2 can produce as-built fully martensitic structure through additive manufacturing, by mitigating formation of a stabilized δ-ferrite phase, and mitigating formation of a stabilized austenite phase. This recipe can be used for a wide range of additive manufacturing conditions. FIG. 2 further depicts exemplary comparisons to specified and 3D-printed 17-4 PH compositions that may utilize an Argon-atomized powder that is melted via laser energy and subsequently solidified.

In connection with various embodiments utilizing compositions as characterized herein, it has been recognized/discovered that fully martensitic 17-4 PH can be built via additive manufacturing, with an increase of martensite fraction along with decreased residual δ-ferrite fraction in a final structure under elevated cooling rates. Surprisingly, the higher cooling rate leads to less residual δ-ferrite, with destabilized primary-solidified δ-ferrite such that a δ-γ transformation has a higher degree of completion. An increased austenite start temperature, denoted by a larger lattice parameter, has been recognized/discovered under elevated cooling rates, via stimulation of increased cooling rate on an earlier δ-γ transformation. Also surprisingly, additional martensite was achieved under elevated cooling rates, which may be a consequence of reduced residual δ-ferrite. It has further been recognized/discovered that a lower concentration of Cr and a higher concentration of Ni and Cu in a 17-4 PH alloy promotes earlier formation of austenite while reducing the stability of δ-ferrite.

The alloy composition may be deposited in a variety of manners. For instance, a liquid form of the alloy may be deposited and transformed to ferrite, the ferrite then being transformed to austenite, and the austenite then being transformed to a martensitic structure. The alloy composition may be deposited as a powder with a laser being used to form liquid from the powder, the liquid being solidified thereafter while a ferrite phase of the liquid is destabilized. Furthermore, layers may be formed by depositing, melting and solidifying additional powder of the alloy composition over a solidified or partially-solidified portion of the alloy composition.

In some embodiments, an alloy composition consisting of iron, chromium, nickel, copper, niobium and tantalum is utilized. For instance, a powder consisting of this alloy composition may be deposited and melted via laser, then solidified while destabilizing a ferrite phase of the solidifying melt. In particular embodiments, the alloy composition consists of: 74-76% iron, 15-15.5% chromium, 4.5-5% nickel, 4.5-5% copper, and 0.15-0.45% of a mixture of niobium and tantalum, by weight. In other embodiments, the alloy composition consists of: 72.5-78.5% iron, 14.5-16% chromium, 4-5.5% nickel, 3-5.5% copper, and 0.15-0.45% of a mixture of niobium and tantalum, by weight. It has been recognized/discovered that each of these alloy compositions may facilitate formation of a structure (e.g., additively manufactured) exhibiting substantially all martensite as noted herein. Certain further embodiments exhibit additional minor elements, such as one or more of the following: 0-1.5% manganese, 0-0.1% carbon, 0-1.5% silicon, 0-0.1% oxygen, 0-0.15% nitrogen, 0-0.04% phosphorous, and 0-0.03% sulfur, by weight.

A martensitic structure as characterized herein may be produced using various approaches. For instance, the martensitic structure may be produced via solidification while continuing to deposit more of the alloy composition thereon. The resulting structure may include a 3D structure having a volume of which at least 90% is martensite, or of which at least 95% is martensite. Certain embodiments are directed to solidifying portions of the alloy composition to form the 3D structure by forming precipitation hardening martensitic stainless steel having equiaxed grains of a grain size that is less than 10 μm, and in certain embodiments less than 5 μm. It has been recognized/discovered that such a grain size can be achieved, using the alloy compositions and approaches characterized herein.

Another embodiment is directed to a method for additively manufacturing a three-dimensional (3D) structure. A first layer of the 3D structure is formed by depositing alloy powder on a target, liquefying the alloy powder using a laser, and solidifying the liquefied alloy powder to produce a martensitic structure while destabilizing a ferrite phase of the alloy powder. Subsequent layers of the 3D structure may be similarly formed over the first layer. For each subsequent layer, additional alloy powder of the same composition is deposited, the additional alloy powder is liquefied using the laser, and the liquefied additional alloy powder is solidified to produce a martensitic structure while destabilizing a ferrite phase of the additional alloy powder.

Destabilizing the ferrite phase in this context may include using approaches as characterized above. For instance, a composition of the alloy powder can be set to reduce a temperature at which δ-ferrite phase material forms during cooling of the liquefied alloy powder, relative to a temperature at which δ-ferrite phase material forms during cooling of a liquefied 17-4 PH alloy. The composition of the alloy powder may be set to increase a temperature at which δ-ferrite phase material transitions to γ-austenite phase during cooling of the liquefied alloy powder, relative to a temperature at which δ-ferrite phase material transitions to γ-austenite during cooling of a liquefied 17-4 PH alloy. Both of the aforementioned reduction and increase in temperature may be obtained with a particular alloy composition (e.g., a powder consisting of iron, chromium, nickel, copper, niobium and tantalum may be used).

Figure 3A:
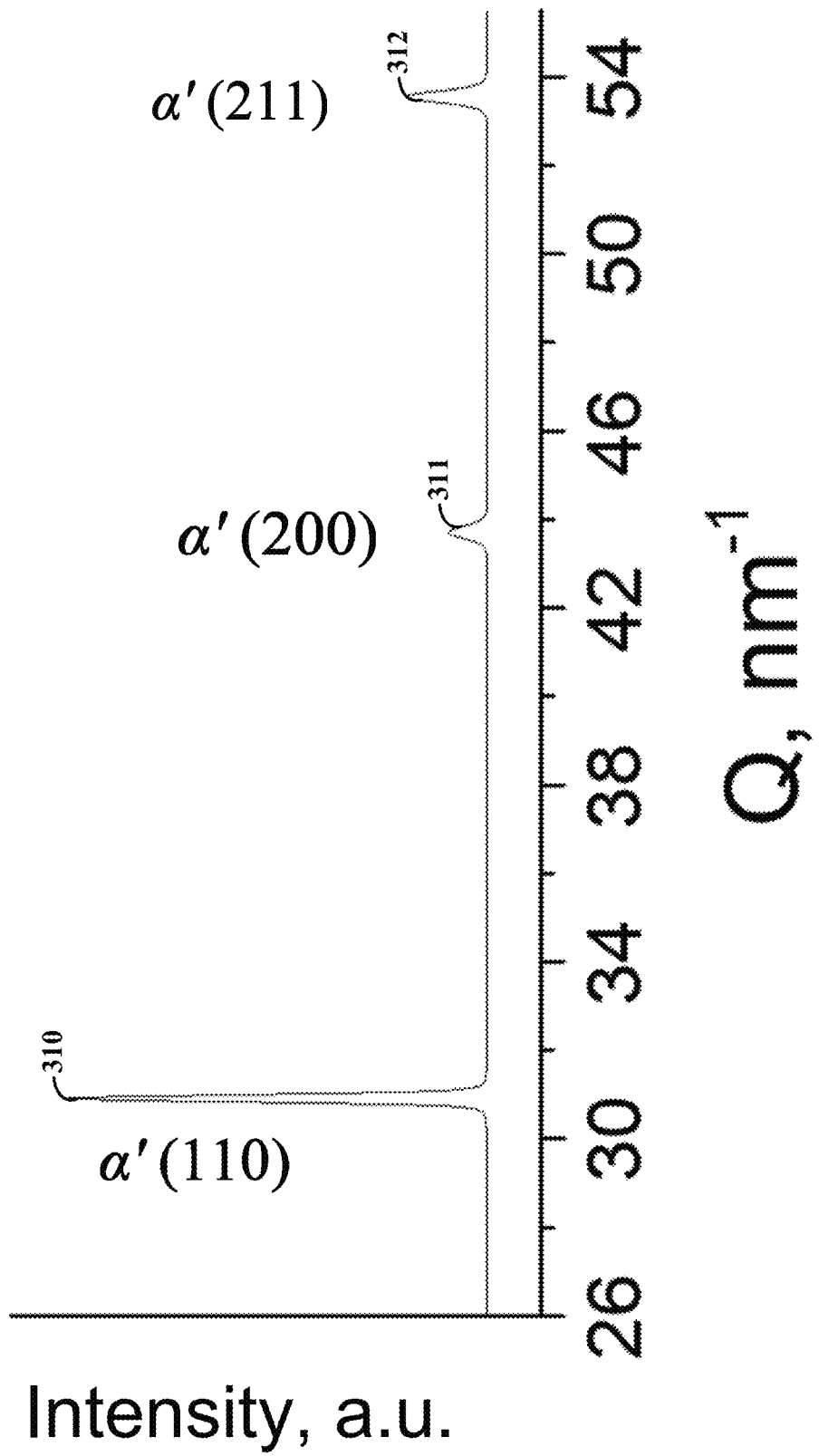
Figure 3B:
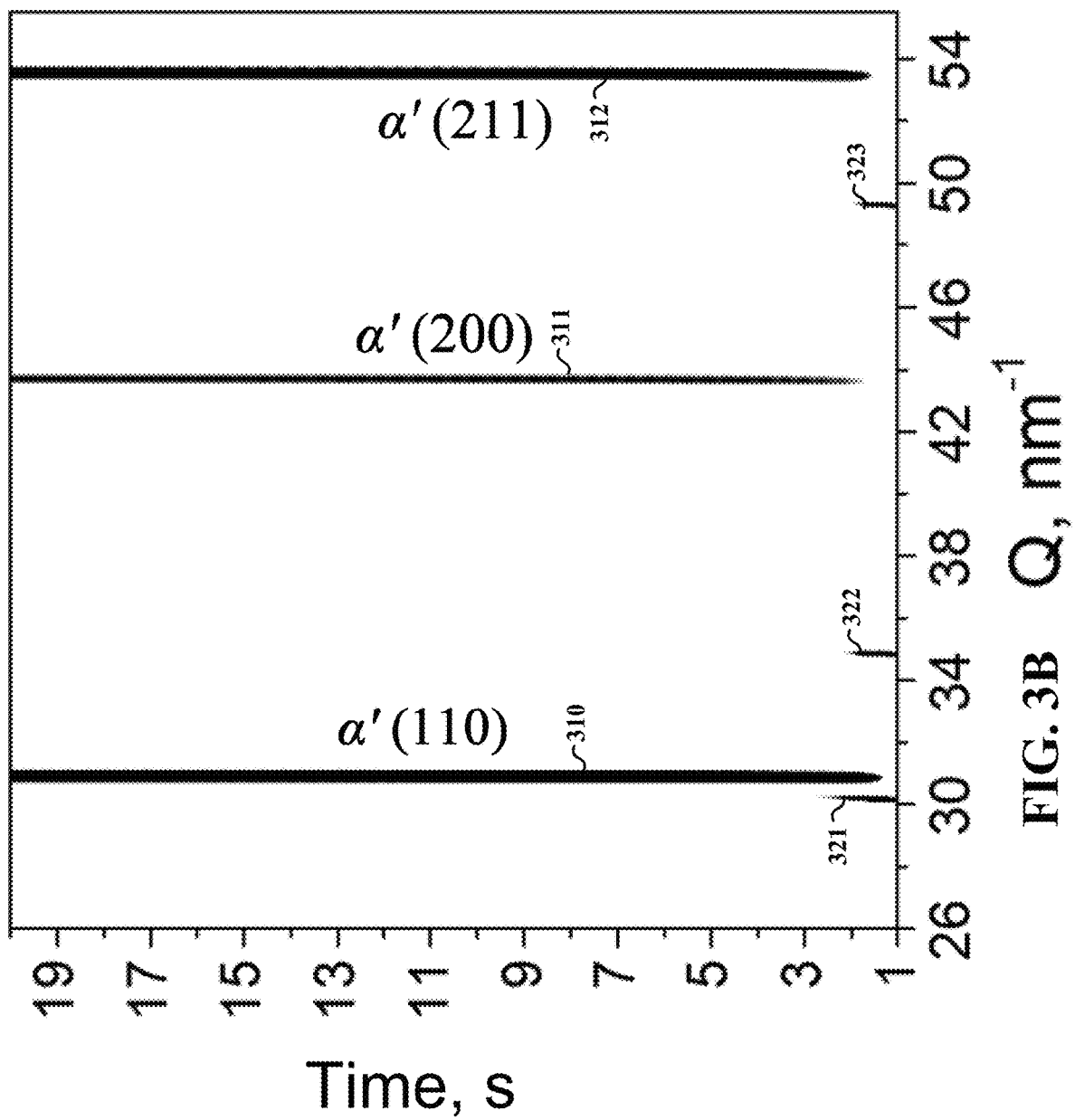
Figure 3C:
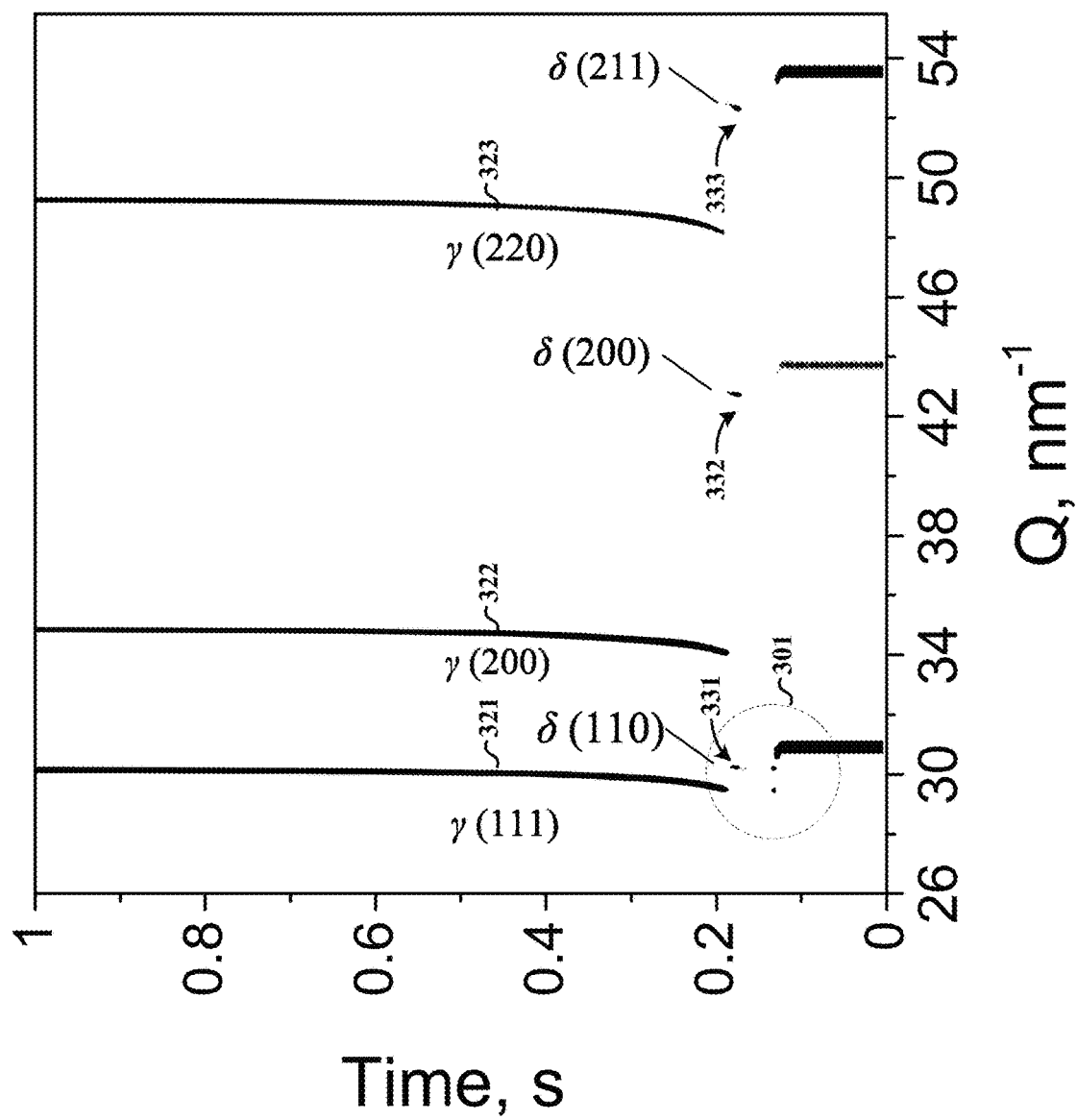
Figure 3D:
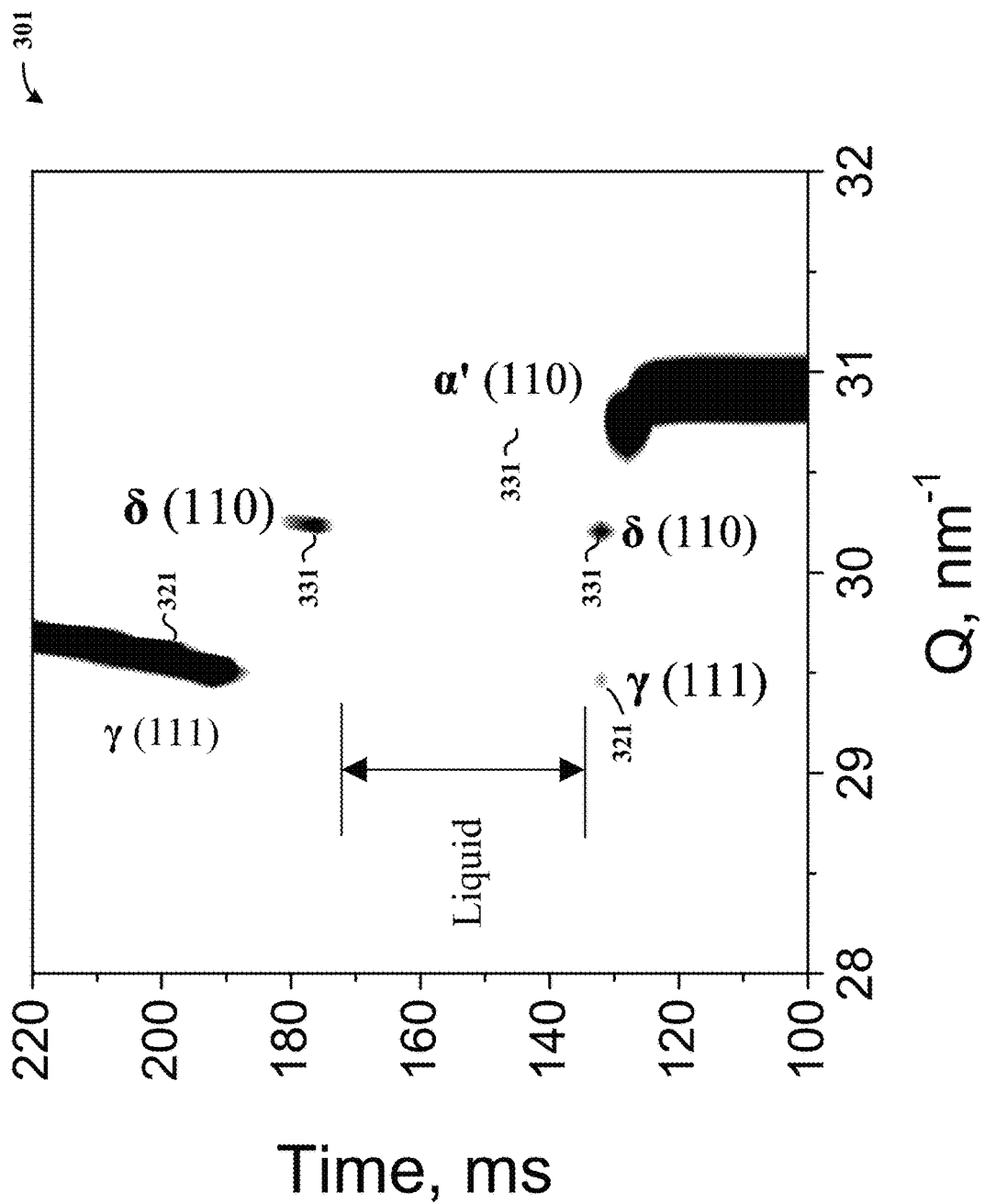

FIGS. 3A, 3B, 3C and 3D show phase transformation behavior of an alloy, as may be implemented in accordance with one or more embodiments. Beginning with FIGS. 3B and 3C, X-ray diffraction results are depicted respectively for cooling times corresponding to 0-1 seconds in FIG. 3C, and 1-19 seconds in FIG. 3B. FIG. 3D shows an enhanced view of inset 301 of FIG. 3C. FIG. 3D shows that, when solidification begins, δ-ferrite 331 at 301 exists for a very short time, upon which the material becomes γ-austenite 321. This is also shown in FIG. 3C with δ-ferrite at 331, 332 and 333 transitioning to γ-austenite at 321, 322 and 323.

Referring to FIG. 3B, the γ-austenite 321, 322, 323 lasts for nearly 3 seconds before transforming into α' martensite 310, 311 and 312. The final phase may be fully or nearly fully α' martensite. Referring back to FIG. 3A, shows a phase constitution of α' martensite 310, 311 and 312, as may be present after cooling to room temperature. Accordingly, such a resulting structure can be realized using compositions and related approaches as recognized/discovered and noted herein.

Figure 4A:
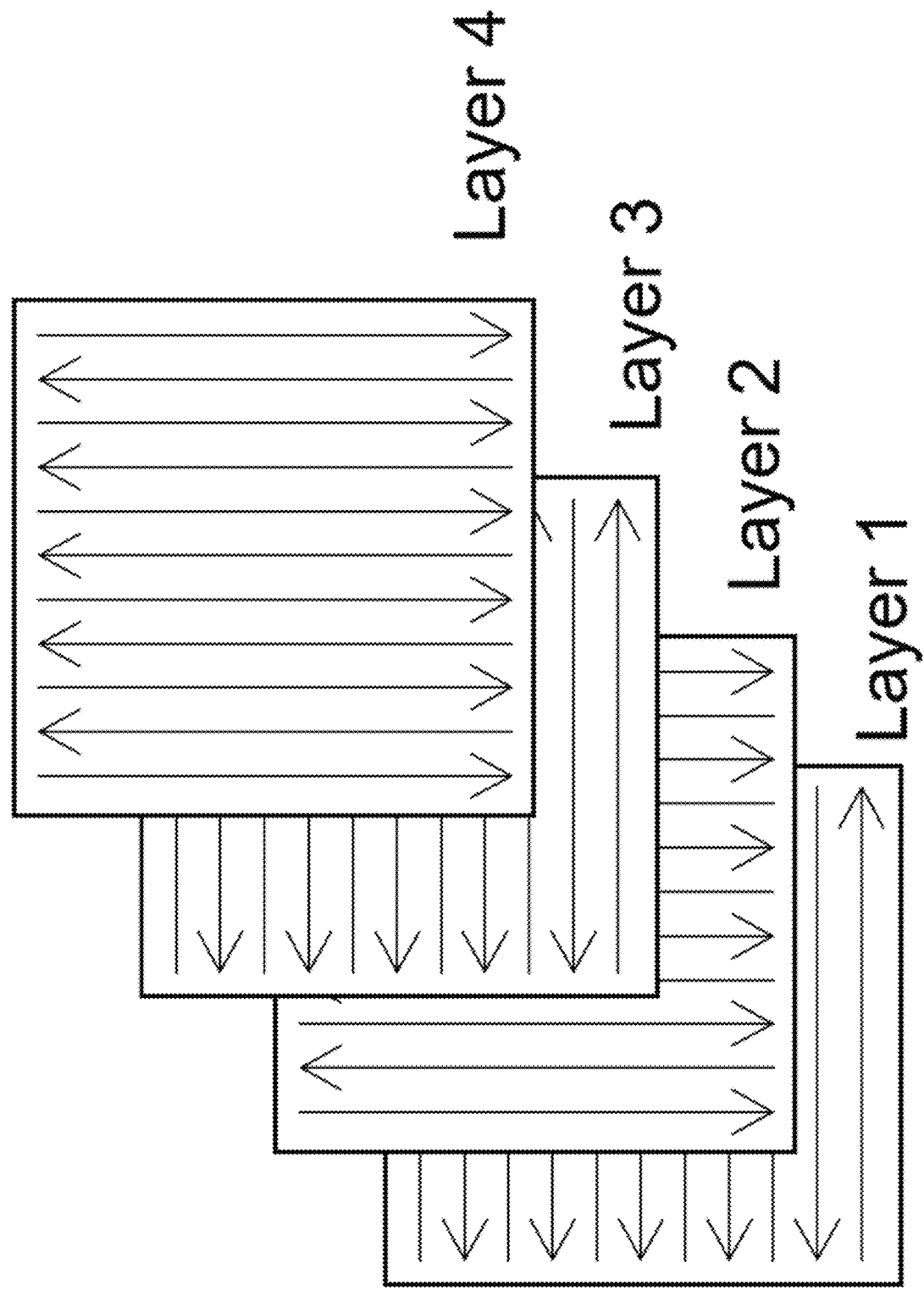
Figure 4B:
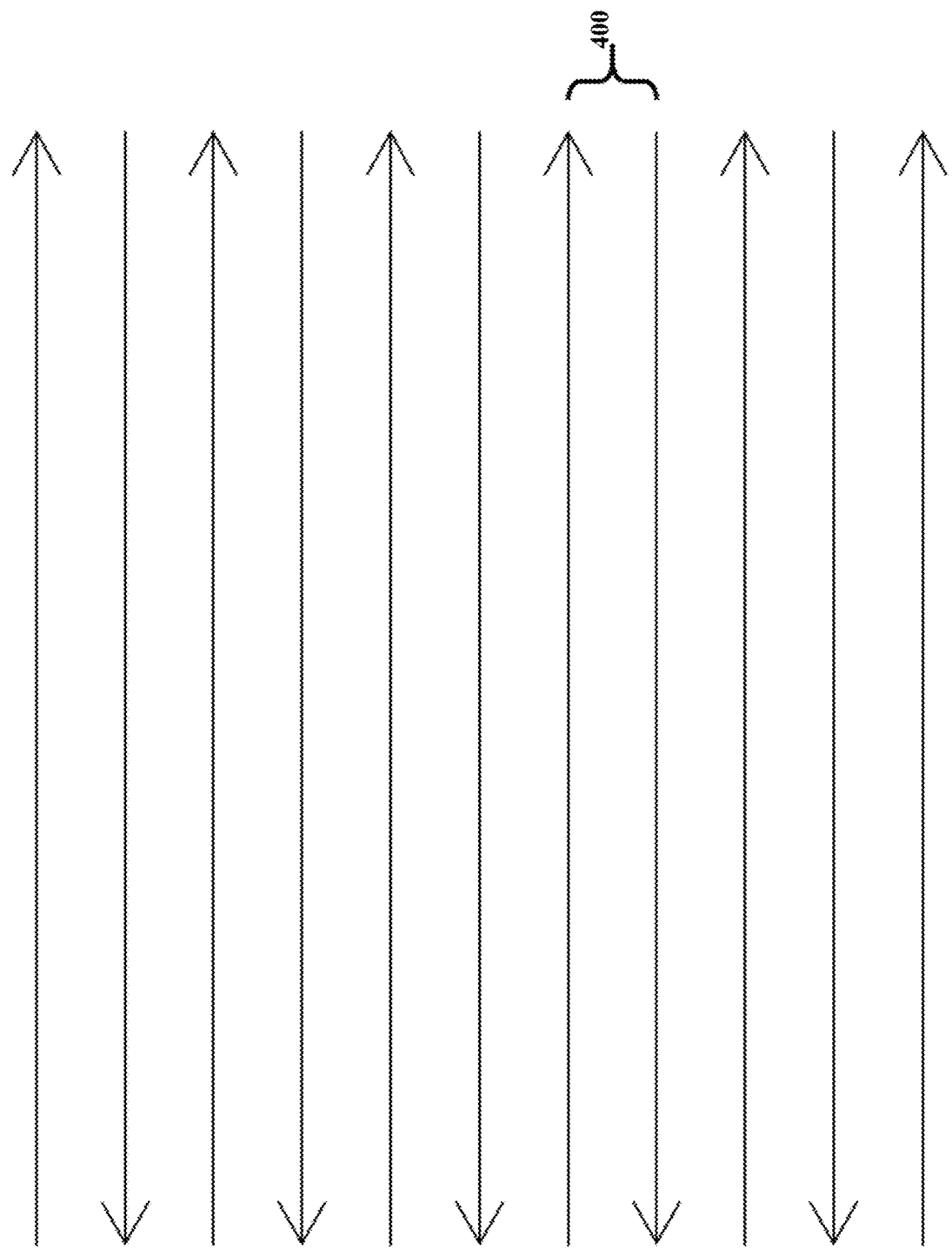

FIGS. 4A-4B show a scan pattern as may be implemented to achieve as-built equiaxed fine grains utilizing an alloy composition as characterized herein, as may be implemented in accordance with one or more embodiments. FIG. 4A depicts respective scan patterns as may be utilized to form successive layers, with each successive layer utilizing a scan pattern that is orthogonal relative to another or other layers immediately above and/or below the layer. FIG. 4B depicts one of the scan patterns of FIG. 4B with hatch spacing 400 (e.g., 0.05-0.2 mm).

Various embodiments are directed to achieving equiaxed fine grains in additive manufacturing of a designed alloy via in-process heat-treatment. A continuous-wave fiber laser with a wavelength of 1070±10 nm, with a spot size of 150~300 μm and 300~500 W power may be used with a scan speed of 0.05~0.35 m/s. Feedstock powder supplied for forming an apparatus may be gas-atomized with argon or nitrogen, with a composition as characterized in one or more embodiments herein. Multiple layers may be formed (e.g., as shown in FIG. 4A), with a spreading thickness of each layer being 35~150 μm. In a more particular implementation, the laser spot size is set 230 μm, the laser power is set to 500 W, and the laser scan speed is set to 0.11 m/s, with a scan pattern that alternates 90 degrees for each layer (e.g., as shown in FIG. 4A, and with hatch spacing as shown in FIG. 4B being 0.05-0.2 mm).

Using this approach, it has been recognized/discovered that an as-built part may be fully composed of equiaxed fine grains with an average grain size of ~3 μm. Columnar grains and epitaxial growth are mitigated or prevented in the as-built part. Accordingly, an alloy composition and AM processing conditions as characterized herein can be utilized to achieve equiaxed fine grains in an as-built AM part by controlling phase-transformation dynamics via in-process heat-treatment. It has further been recognized/discovered that forming a 3D structure in accordance with these approaches may be implemented by forming precipitation hardening martensitic stainless steel having equiaxed grains of a grain size that is less than 10 μm. Certain embodiments are directed to such an approach, and embodiments are directed to a structure having such equiaxed grains and related grain size, which has been unexpectedly attained via use of alloy compositions and related approaches herein.

Based upon the above discussion and illustrations, those skilled in the art will readily recognize that various modifications and changes may be made to the various embodiments without strictly following the exemplary embodiments and applications illustrated and described herein. For example, the percentages of respective components in the alloys characterized herein may be varied while maintaining the recognized/discovered improvements relative to formation of a fully martensitic structure, such as those increasing the transition temperature of δ-ferrite to γ-austenite, and of γ-austenite to α' martensite. Further, approaches herein may utilize the compositions characterized in a variety of manufacturing approaches, including additive manufacturing as well as casting. Various additive manufacturing procedures may be utilized as well, including laser powder bed fusion as noted herein, as well as blown powder additive manufacturing, wire-feed additive manufacturing, and foil-feed additive manufacturing. Further, different forms of product such as powder, wire, and foil may be provided in accordance with such applications. Such modifications do not depart from the true spirit and scope of various aspects of the invention, including aspects set forth in the claims.

What is claimed is:

1. A method for forming a three-dimensional (3D) structure, the method comprising: depositing an alloy composition on a target, including adding a destabilizing component to the alloy composition that destabilizes the formation of ferrite during cooling; and solidifying portions of the alloy composition to form the 3D structure, including producing a martensitic structure having a volume that is 90-100% martensite by using the destabilizing component to destabilize the formation of a ferrite phase of the alloy composition while solidifying the alloy composition.

2. The method of claim 1, wherein destabilizing the ferrite phase includes facilitating transformation of δ-ferrite in the alloy composition to austenite and mitigating the formation δ-ferrite phase material from the alloy composition, to produce the martensitic structure from the austenite.

3. The method of claim 2, wherein depositing the alloy includes depositing alloy powder and heating the powder to form a liquid, and wherein solidifying the portions of the alloy composition includes transforming substantially all of the austenite to martensite while solidifying the liquid and prior to further heat treatment.

4. The method of claim 1, wherein destabilizing the ferrite phase includes depositing the alloy composition with materials that reduce a temperature at which δ-ferrite phase material forms from the alloy composition during cooling thereof, relative to a temperature at which δ-ferrite phase material forms during cooling of a 17-4 PH alloy composition.

5. The method of claim 1, wherein destabilizing the ferrite phase includes depositing the alloy composition with materials that increase a temperature at which δ-ferrite phase material formed from the alloy composition transitions to a γ-austenite phase material during cooling thereof, relative to a temperature at which δ-ferrite phase material transitions to γ-austenite during cooling of a 17-4 PH alloy composition.

6. The method of claim 1, wherein destabilizing the ferrite phase includes depositing the alloy composition with the destabilizing component including materials that:
reduce a temperature at which δ-ferrite phase material forms from the alloy composition during cooling thereof, relative to a temperature at which δ-ferrite phase material forms during cooling of a 17-4 PH alloy composition; and
increase a temperature at which δ-ferrite phase material formed from the alloy composition transitions to a γ-austenite phase material during cooling thereof, relative to a temperature at which δ-ferrite phase material transitions to γ-austenite during cooling of a 17-4 PH alloy composition.

7. The method of claim 6, wherein the 17-4 PH alloy composition includes Argon-atomized powder.

8. The method of claim 6, wherein producing the martensitic structure by destabilizing a ferrite phase of the alloy composition while solidifying the alloy composition includes forming austenite and transforming substantially all of the austenite to martensite.

9. The method of claim 1, wherein depositing the alloy composition includes depositing an alloy composition consisting of: iron, chromium, nickel, copper, niobium and tantalum.

10. The method of claim 1, wherein destabilizing the ferrite phase of the alloy composition while solidifying the alloy composition includes depositing the alloy composition having materials consisting of iron, chromium, nickel, copper, niobium and tantalum, and using the composition of the respective materials to destabilize the ferrite phase thereof.

11. The method of claim 1, wherein depositing the alloy composition includes depositing an alloy composition consisting of: 72.5-78.5% iron, 14.5-16% chromium, 4-5.5% nickel, 3-5.5% copper, and 0.15-0.45% of a mixture of niobium and tantalum, by weight.

12. The method of claim 1, wherein producing the martensitic structure via the solidifying includes producing the martensitic structure while continuing to deposit more of the alloy composition thereon.

13. The method of claim 1, wherein producing the martensitic structure via the solidifying includes solidifying all of the deposited alloy composition to form the 3D structure.

14. The method of claim 1, wherein:
depositing the alloy composition on a target includes depositing a liquid form of the alloy; and
producing the martensitic structure via the solidifying includes transforming the liquid alloy to ferrite, transforming the ferrite to austenite, and transforming the austenite to the martensitic structure.

15. The method of claim 1, wherein producing the martensitic structure includes forming the 3D structure having a volume of which at least 95% is martensite.

16. The method of claim 1, wherein:
depositing the alloy composition includes depositing the alloy composition as a powder; and
solidifying the portions of the alloy composition includes forming layers of the alloy composition by using a laser to form liquid from the powder and thereafter solidifying the liquid while destabilizing a ferrite phase of the liquid, including melting and solidifying powder of the alloy composition that is deposited over a solidified portion of the alloy composition.

17. The method of claim 1, wherein solidifying the portions of the alloy composition to form the 3D structure includes forming martensitic stainless steel having equiaxed grains of a grain size that is less than 10 μm.

18. A method for additively manufacturing a three-dimensional (3D) structure, the method comprising: forming a first layer of the 3D structure by depositing alloy powder on a target, liquefying the alloy powder via application of laser energy, and solidifying the liquefied alloy powder to produce a martensitic structure having a volume that is 90-100% martensite by destabilizing the formation of a ferrite phase of the alloy powder; forming subsequent layers of the 3D structure over the first layer by, for each subsequent layer, depositing additional alloy powder of the same composition of the alloy powder used in forming the first layer, liquefying the additional alloy powder via application of laser energy, and solidifying the liquefied additional alloy powder to produce a martensitic structure having a volume that is 90-100% martensite by destabilizing the formation of a ferrite phase of the additional alloy powder.

19. The method of claim 18, wherein forming the first layer and forming the subsequent layers include:
destabilizing the ferrite phase using a composition of alloys in the alloy powder to reduce a temperature at which δ-ferrite phase material forms during cooling of the liquefied alloy powder, relative to a temperature at which δ-ferrite phase material forms during cooling of a liquefied 17-4 PH alloy; and
increasing a temperature at which δ-ferrite phase material transitions to γ-austenite phase during cooling of the liquefied alloy powder, relative to a temperature at which δ-ferrite phase material transitions to γ-austenite during cooling of a liquefied 17-4 PH alloy.

20. The method of claim 18, wherein the alloy powder consists of: iron, chromium, nickel, copper, niobium and tantalum.

21. An alloy powder composition of matter for forming martensitic 17-4 stainless steel having a volume that is 90-100% martensite via laser powder bed fusion additive manufacturing, the alloy powder comprising: iron; chromium; nickel; copper; niobium; and tantalum.

* * * * *